(12) United States Patent
Tanaka et al.

(10) Patent No.: US 8,978,721 B2
(45) Date of Patent: Mar. 17, 2015

(54) TYRE, THE INNER WALL OF WHICH IS PROVIDED WITH A HEAT-EXPANDABLE RUBBER LAYER

(75) Inventors: Mitsue Tanaka, Tokyo (JP); Salvatore Pagano, Tokyo (JP)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/502,812

(22) PCT Filed: Oct. 25, 2010

(86) PCT No.: PCT/EP2010/066019
§ 371 (c)(1),
(2), (4) Date: Jun. 12, 2012

(87) PCT Pub. No.: WO2011/051203
PCT Pub. Date: May 5, 2011

(65) Prior Publication Data
US 2012/0247637 A1   Oct. 4, 2012

(30) Foreign Application Priority Data
Oct. 27, 2009  (FR) ...................... 09 57521

(51) Int. Cl.
| | | |
|---|---|---|
| *B60C 5/00* | (2006.01) | |
| *B32B 5/18* | (2006.01) | |
| *B32B 5/20* | (2006.01) | |
| *B60C 1/00* | (2006.01) | |
| *C08J 9/10* | (2006.01) | |
| *C08F 36/00* | (2006.01) | |
| *B29D 30/00* | (2006.01) | |
| *B60C 19/00* | (2006.01) | |
| *C08L 7/00* | (2006.01) | |
| *C08K 5/23* | (2006.01) | |
| *C08L 9/06* | (2006.01) | |
| *C08L 23/22* | (2006.01) | |

(52) U.S. Cl.
CPC .............. B29D 30/0061 (2013.01); B60C 1/00 (2013.01); B60C 19/002 (2013.01); C08J 9/10 (2013.01); C08J 9/103 (2013.01); C08L 7/00 (2013.01); B29D 2030/0072 (2013.01); C08J 2321/00 (2013.01); C08K 5/23 (2013.01); C08L 9/06 (2013.01); C08L 23/22 (2013.01); Y02T 10/862 (2013.01)
USPC .............. 152/157; 152/450; 156/78; 521/95; 521/150; 524/571

(58) Field of Classification Search
USPC .............. 152/157, 450; 156/78; 521/95, 150; 524/571
See application file for complete search history.

(56) References Cited

U.S. PATENT DOCUMENTS

| | | | |
|---|---|---|---|
| 3,878,147 A | 4/1975 | Craven | 260/18 R |
| 5,147,477 A | 9/1992 | Mouri et al. | 152/209 R |
| 5,977,238 A | 11/1999 | Labauze | 524/492 |
| 6,013,718 A | 1/2000 | Cabioch et al. | 524/506 |
| 6,427,738 B1 | 8/2002 | Fujino et al. | 152/209.4 |
| 6,497,261 B1 | 12/2002 | Fukushima et al. | 152/209.4 |
| 6,503,973 B2 | 1/2003 | Robert et al. | 524/492 |
| 6,730,710 B2 | 5/2004 | Mori et al. | 521/54 |
| 6,774,255 B1 | 8/2004 | Tardivat et al. | 556/427 |
| 6,815,473 B2 | 11/2004 | Robert et al. | 523/215 |
| 6,849,754 B2 | 2/2005 | Deschler et al. | 556/427 |
| 7,217,751 B2 | 5/2007 | Durel et al. | 524/262 |
| 7,238,740 B2 | 7/2007 | Belin et al. | 524/495 |
| 7,335,692 B2 | 2/2008 | Vasseur et al. | 524/312 |
| 7,820,771 B2 | 10/2010 | Lapra et al. | 525/479 |
| 2003/0119927 A1 | 6/2003 | Mori et al. | 521/50 |
| 2004/0051210 A1 | 3/2004 | Tardivat et al. | 264/349 |
| 2005/0016650 A1 | 1/2005 | Durel et al. | 152/209.1 |
| 2005/0016651 A1 | 1/2005 | Durel et al. | 152/209.1 |

(Continued)

FOREIGN PATENT DOCUMENTS

| | | |
|---|---|---|
| DE | 30 42 350 A1 | 5/1982 |
| DE | 197 50 229 A1 | 6/1999 |

(Continued)

OTHER PUBLICATIONS

ChemYQ—OBSH;4,4'-Oxybis(benzenesulfonyl hydrazide)—http://chemyq.com/En/xz/xz1/2027rbhep.htm.*

(Continued)

*Primary Examiner* — Ling Choi
*Assistant Examiner* — Ronald Grinsted
(74) *Attorney, Agent, or Firm* — Fitzpatrick, Cella, Harper & Scinto

(57) ABSTRACT

A heat-expandable rubber layer is provided to an inner all of a pneumatic tire when the tire is in an uncured state. The rubber layer is expanded when the tire is in a vulcanized state. Once expanded, the rubber layer is capable of reducing rolling noises of the tire. The rubber layer includes an elastomer composition based on at least an elastomer, e.g., natural rubber or butyl rubber; a reinforcing filler, e.g., silica and/or carbon black; between 10 and 80 phr of a blowing agent, e.g., an azodicarbonamide compound; and between 10 and 50 phr of a hot-melt compound with a melting point between 70° C. and 150° C., e.g., urea. The combination of the blowing agent and the hot-melt compound, at recommended high contents, makes it possible to very greatly reduce an expansion ratio and therefore a thickness of the rubber layer once the pneumatic tire is vulcanized, without affecting noise absorption properties provided by the blowing agent.

21 Claims, 4 Drawing Sheets

(56) References Cited

U.S. PATENT DOCUMENTS

Figure 1:
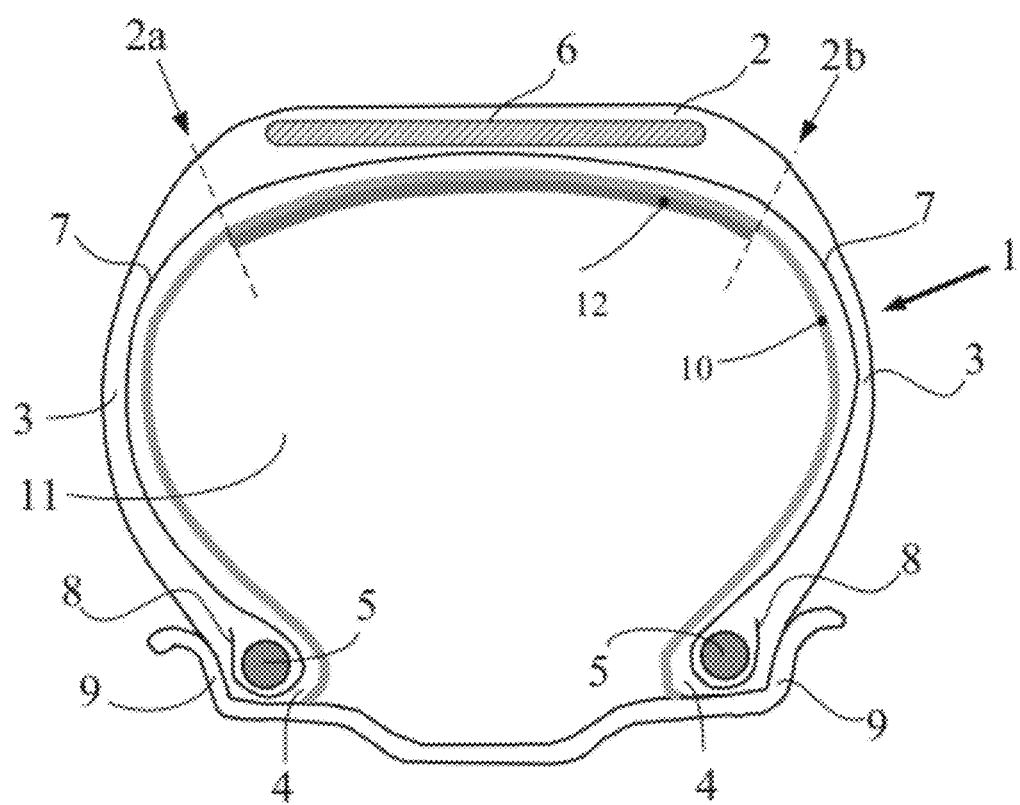

| | | | |
|---|---|---|---|
| 2006/0089445 A1 | 4/2006 | Gandon-Pain | 524/492 |
| 2008/0009564 A1 | 1/2008 | Robert et al. | 523/35 |
| 2008/0087368 A1 | 4/2008 | Nobuchika et al. | 156/117 |
| 2008/0319125 A1 | 12/2008 | Boswell et al. | 524/543 |
| 2009/0186961 A1 | 7/2009 | Araujo Da Silva et al. | 523/150 |
| 2009/0209709 A1 | 8/2009 | Araujo Da Silva et al. | 525/333.1 |
| 2009/0234066 A1 | 9/2009 | Araujo Da Silva et al. | 524/571 |
| 2009/0270558 A1 | 10/2009 | Gandon-Pain et al. | 525/190 |
| 2010/0022714 A1 | 1/2010 | Varagniat et al. | 525/209 |
| 2010/0069530 A1 | 3/2010 | Hidrot et al. | 523/157 |
| 2011/0021702 A1 | 1/2011 | Gandon-Pain et al. | 525/55 |
| 2011/0237707 A1 | 9/2011 | Hidrot | 523/156 |

FOREIGN PATENT DOCUMENTS

| | | |
|---|---|---|
| DE | 198 06 935 A1 | 9/1999 |
| DE | 102 58 436 A1 | 6/2003 |
| EP | 0 367 556 A2 | 5/1990 |
| EP | 0 826 522 A1 | 3/1998 |
| EP | 0 885 925 A1 | 12/1998 |
| EP | 0 940 435 A | 9/1999 |
| EP | 0 969 040 A1 | 1/2000 |
| EP | 1 676 722 A1 | 7/2006 |
| EP | 1 800 911 A2 | 6/2007 |
| EP | 1 911 571 A1 | 4/2008 |
| EP | 1911571 A1 * | 4/2008 |
| EP | 2 042 549 A1 | 4/2009 |
| FR | 2 877 348 A1 | 5/2006 |
| JP | 3-159803 A | 7/1991 |
| JP | 4-38207 A | 2/1992 |
| JP | 4-368205 A | 12/1992 |
| JP | 06-040206 A | 2/1994 |
| JP | 2002-211203 A | 7/2002 |
| JP | 2003-183434 A | 7/2003 |
| JP | 2003-285607 A | 10/2003 |
| JP | 2004-091747 A | 3/2004 |
| JP | 2006-299031 A | 11/2006 |
| JP | 2007-039499 A | 2/2007 |
| JP | 2007-314683 A | 12/2007 |
| JP | 2008-001826 A | 1/2008 |
| JP | 2008-150413 A | 7/2008 |
| JP | 2009-256540 A | 11/2009 |
| KR | 10-2004-0031509 A | 4/2004 |
| WO | WO 97/36724 A2 | 10/1997 |
| WO | WO 99/09036 A1 | 2/1999 |
| WO | WO 99/16600 A1 | 4/1999 |
| WO | WO 02/30939 A1 | 4/2002 |
| WO | WO 02/31041 A1 | 4/2002 |
| WO | WO 02/083782 A1 | 10/2002 |
| WO | 02/088238 A1 | 11/2002 |
| WO | WO 03/002648 A1 | 1/2003 |
| WO | WO 03/002649 A1 | 1/2003 |
| WO | WO 2006/023815 A2 | 3/2006 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/061550 A1 | 5/2007 |
| WO | WO 2007/098080 A2 | 8/2007 |
| WO | WO 2008/003434 A1 | 1/2008 |
| WO | WO 2008/003435 A1 | 1/2008 |
| WO | 2008/080750 A1 | 7/2008 |
| WO | 2008/080751 A1 | 7/2008 |
| WO | 2009/083125 A1 | 7/2009 |
| WO | 2009/112220 A1 | 9/2009 |

OTHER PUBLICATIONS

ChemYQ—OBSH;4,4'-Oxybis(benzenesulfonyl hydrazide)—http://chemyq.com/En/xz/xz1/2027rbhep.htm—Downloaded online—May 3, 2013.*

Pohanish, HazMat Data: For First Response, Transportation, Storage, and Security, $2^{nd}$ edition, John Wiley & Sons, 2004, pp. 1121-1122.

Database WPI Week 199305, Thomson Scientific, London, Great Britain, 1993-041685.

* cited by examiner

TYRE, THE INNER WALL OF WHICH IS PROVIDED WITH A HEAT-EXPANDABLE RUBBER LAYER

1. FIELD OF THE INVENTION

The invention relates to tyres for motor vehicles and also to rubber compositions that can be used for the manufacture of such tyres.

It relates more particularly to the pneumatic tyres having an inner wall or inflation cavity that is airtight (or impermeable to another inflation gas) and which is provided with a layer of foamed rubber intended for reducing the noise emitted by these tyres when the vehicles are running.

2. PRIOR ART

It is known that the noise emitted by a pneumatic tyre when rolling originates, inter alia, from the vibrations of its structure following contact of the tyre with the uneven roadway, also giving rise to a generation of various sound waves. This is all ultimately manifested in the form of noise, both inside and outside the vehicle. The amplitude of these various manifestations is dependent on the modes of vibration characteristic of the pneumatic tyre but also on the nature of the surface on which the vehicle is moving. The range of frequencies corresponding to the noise generated by the tyres typically extends from 20 to 4000 Hz approximately.

As regards the noise emitted outside the vehicle, the various interactions between the pneumatic tyre and the road surface, and the pneumatic tyre and the air are relevant, which will give rise to a disturbance for local residents when the vehicle is running along a roadway. In this case several sources of noise are also distinguished such as the noise referred to as "indentation noise" due to the impact of the roughness of the road in the contact area, the noise referred to as "friction noise" essentially generated at the end of the contact area, the noise referred to as "tread pattern noise" due to the arrangement of the tread pattern elements and to the resonance in the various grooves. The range of frequencies in question here typically corresponds to a range extending from 300 to 3000 Hz approximately.

As regards the noise detected inside the vehicle, two modes of sound propagation coexist:
  the vibrations are transmitted by the wheel centre, the suspension system and the transmission ultimately generating noise in the passenger compartment; this is then referred to as solid-borne transmission, which is generally dominant for the low frequencies of the spectrum (up to approximately 400 Hz);
  the sound waves emitted by the pneumatic tyre are directly propagated by an airborne route inside the vehicle, the latter serving as a filter; this is then referred to as airborne transmission, which generally dominates in the high frequencies (approximately 600 Hz and above).

The noise referred to as "road noise" refers rather to the overall level detected in the vehicle to and in a frequency range extending up to 2000 Hz.

Finally, a large part of the noise detected inside the vehicle is introduced by the "cavity noise" which refers to the disturbance due to the resonance of the inflation cavity of the pneumatic tyre, this noise dominating in a specific frequency range from approximately 190 to 230 Hz.

In order to reduce the rolling noise of a pneumatic tyre, in particular the cavity noise, it is known to provide its inner wall with a layer of foam rubber based on an elastomer such as polyurethane or butyl rubber, and an expansion agent (or blowing agent), as described for example in the patents or patent applications DE 3042350, DE 19750229, DE 19806935, EP 0 367 556, EP 1 676 722 (or U.S. Pat. No. 7,389,802), EP 1 800 911 (or US 2007/0137752 A1) and JP 06-40206.

These blowing agents, such as for example nitro, sulphonyl or azo compounds, are capable, during a thermal activation, for example during the vulcanization of the pneumatic tyre, of releasing a large amount of gas, especially nitrogen, and thus of leading to the formation of bubbles within a sufficiently soft material such as a rubber composition comprising such blowing agents.

Experimentation shows however that the expansion ratios obtained with such agents, if it is desired to obtain a significant and satisfactory noise reduction, are particularly high, so much so that the control of the uniformity of the thickness of the foam rubber layer once it is expanded, inside the pneumatic tyre, is relatively difficult. This is ultimately prejudicial to an efficient industrial control of the manufacture of these pneumatic tyres.

3. BRIEF DESCRIPTION OF THE INVENTION

The Applicants have discovered, during their research, a rubber composition that makes it possible, owing to the incorporation of a specific hot-melt compound, to substantially reduce the expansion ratio once the pneumatic tyre is vulcanized, without furthermore affecting the noise absorption properties provided by the blowing agent. The control of the uniformity of thickness of foam rubber in the cavity of the pneumatic tyre, especially along the radial position in question, is thus notably improved.

Similarly, at an identical layer thickness, it is also possible to very significantly increase the noise absorption capacity of this layer by adding such a hot-melt compound.

Consequently, the present invention relates to a pneumatic tyre in the unvulcanized state, the inner wall of which is provided with a heat-expandable rubber layer, said layer comprising an elastomer composition comprising at least an elastomer, a reinforcing filler, between 10 and 80 phr of a blowing agent and between 10 and 50 phr of a hot-melt compound, the melting point of which is between 70° C. and 150° C.

Unexpectedly, the combined use of these two compounds, at the recommended high contents, makes it possible to very greatly reduce the expansion ratio and therefore the thickness of the foam rubber layer in the final expanded state (i.e. once the pneumatic tyre is vulcanized), without affecting the noise absorption properties provided by the blowing agent.

The invention also relates to a pneumatic tyre in the vulcanized state obtained after curing (vulcanization) of the uncured pneumatic tyre in accordance with the invention as described above.

The pneumatic tyres of the invention are particularly intended to be fitted on motor vehicles of the passenger type, including 4×4 (four-wheel drive) vehicles and SUV vehicles ("Sport Utility Vehicles"), two-wheel vehicles (especially motorcycles), and also industrial vehicles chosen in particular from vans and heavy vehicles (i.e. underground trains, buses, heavy road transport vehicles such as lorries and tractor units).

The invention relates to the above tyres both in the uncured state (i.e. before curing) and in the cured state (i.e. after crosslinking or vulcanization).

3.1. BRIEF DESCRIPTION OF THE DRAWINGS

Figure 2:
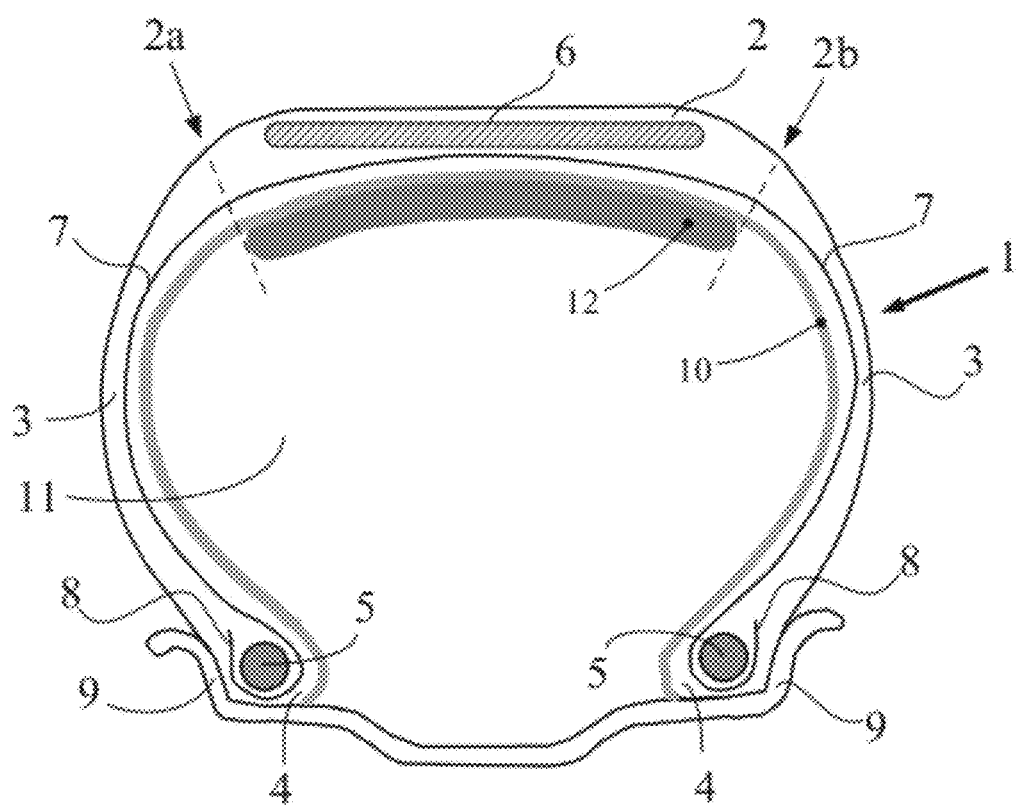
Figure 3:
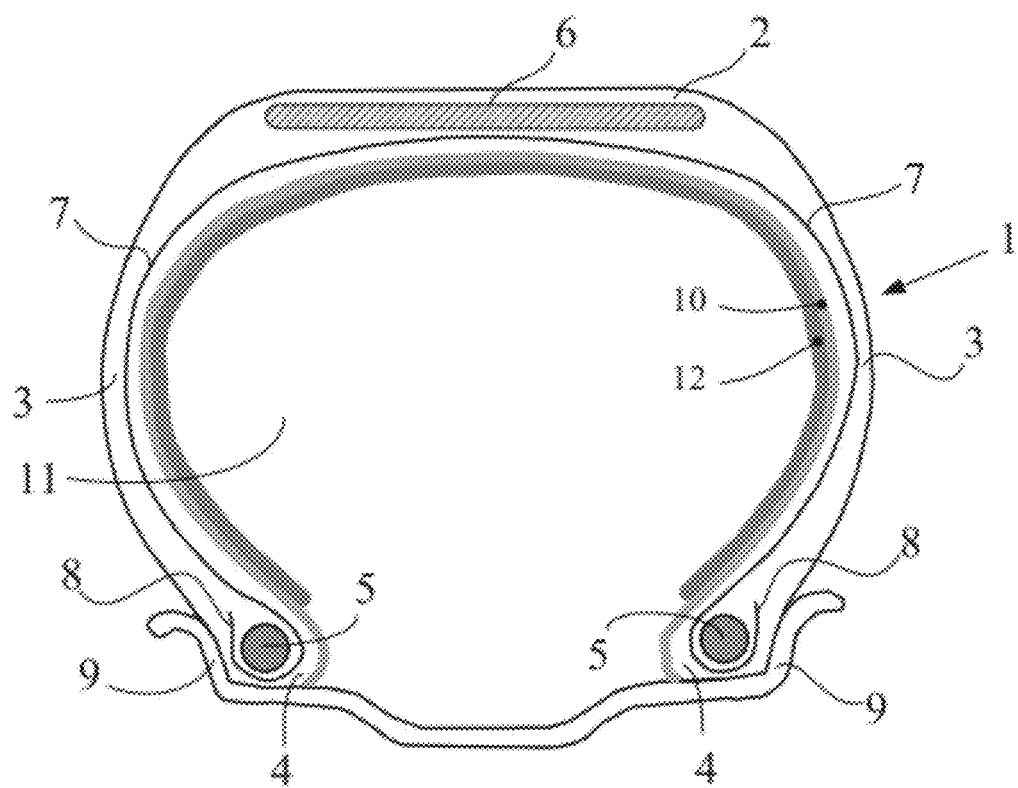
Figure 4:
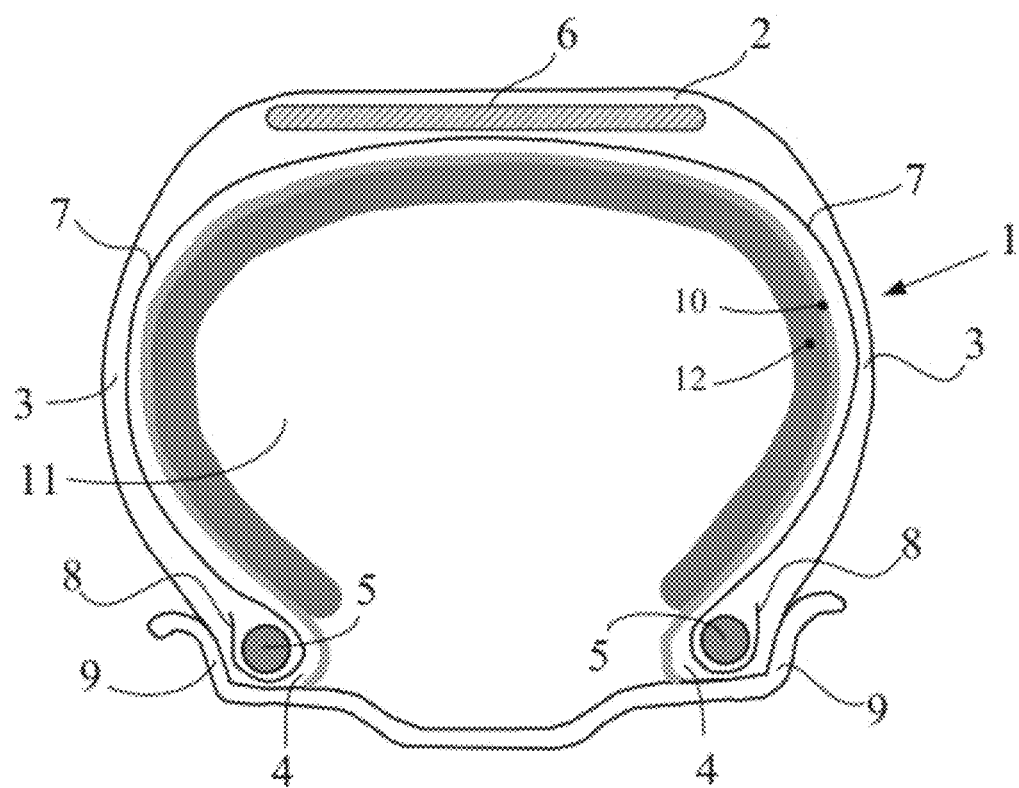

The invention and its advantages will be readily understood in light of the description and exemplary embodiments that follow, and also FIGS. 1 to 4 relating to these examples which schematically show, in radial cross section:

an example of a pneumatic tyre in accordance with the invention, in the uncured (i.e. unvulcanized) state, the inner wall of which is provided with a heat-expandable rubber layer extending under the crown, substantially from one shoulder to the other (FIG. 1);

an example of a pneumatic tyre in accordance with the invention, in the cured (i.e. vulcanized) state, the inner wall of which is provided with a layer of foam rubber, which is therefore in the expanded state, obtained after curing the tyre from the preceding FIG. 1 (FIG. 2);

another example of a tyre in accordance with the invention, in the uncured state, the inner wall of which is provided with a heat-expandable rubber layer which in this case covers substantially all of the inner wall of the tyre (FIG. 3);

another example of a tyre in accordance with the invention, in the cured state, the inner wall of which is provided with a layer of foam rubber, which is therefore in the expanded state, obtained for example after curing the pneumatic tyre from the preceding FIG. 3 (FIG. 4).

4. DETAILED DESCRIPTION OF THE INVENTION

In the present description, unless expressly indicated otherwise, all the percentages (%) indicated are % by weight. The abbreviation "phr" signifies parts by weight per hundred parts of elastomer (of the total of the elastomers if several elastomers are present).

Moreover, any interval of values denoted by the expression "between a and b" represents the range of values extending from more than "a" to less than "b" (i.e. limits a and b excluded) whereas any interval of values denoted by the expression "from a to b" means the range of values extending from "a" to "b" (i.e. including the strict limits a and b).

The pneumatic tyre of the invention therefore has the essential feature that the inner wall thereof is provided with a heat-expandable rubber layer, capable of reducing the cavity noise once it is expanded, said layer comprising an elastomer composition comprising at least:

a (at least one) elastomer;
a (at least one) filler;
between 10 and 80 phr of a (at least one) blowing agent,
between 5 and 50 phr of a (at least one) hot-melt compound, the melting point of which is between 70° C. and 150° C.

The various compounds above are described in detail hereinbelow.

4.1. Elastomer

The elastomer (or indifferently "rubber") used is preferably of diene type, although other elastomers can be used, for example elastomers of polyurethane type or thermoplastic elastomers (TPEs) such as thermoplastic styrene elastomers (TPSs).

As is known, the term "diene" elastomer should be understood to mean an elastomer resulting at least in part (i.e., a homopolymer or a copolymer) from diene monomers (monomers bearing two carbon-carbon double bonds which may or may not be conjugated).

Diene elastomers may be classified, in a known manner, into two categories: those said to be "essentially unsaturated" and those said to be "essentially saturated". For example, butyl rubbers or diene/α-olefin copolymers of the EPDM type fall under the category of essentially saturated diene elastomers, having a low or very low content of units of diene origin, always less than 15% (mol %). A contrario, the expression "essentially unsaturated diene elastomer" is understood to mean a diene elastomer resulting at least partly from conjugated diene monomers, having a content of units of diene origin (conjugated dienes) that is greater than 15% (mol %). In the "essentially unsaturated" diene elastomer category, the expression "highly unsaturated diene elastomer" is understood in particular to mean a diene elastomer having a content of units of diene origin (conjugated dienes) that is greater than 50%.

Having given these definitions, it will be understood more particularly that a diene elastomer that can be used means:

(a)—any homopolymer obtained by polymerizing a conjugated diene monomer preferably having from 4 to 12 carbon atoms;

(b)—any copolymer obtained by copolymerizing one or more conjugated dienes with one another or with one or more vinylaromatic compounds preferably having from 8 to 20 carbon atoms;

(c)—a ternary copolymer obtained by copolymerizing ethylene, an α-olefin preferably having from 3 to 6 carbon atoms with an unconjugated diene monomer preferably having from 6 to 12 carbon atoms, such as for example the elastomers obtained from ethylene, propylene and an unconjugated diene monomer of the aforementioned type such as in particular 1,4-hexadiene, ethylidene norbornene and dicyclopentadiene; and (d)—a copolymer of isobutene and isoprene (or butyl rubber), and also the halogenated, in particular chlorinated or brominated, versions of this type of copolymer.

It is preferred to use a diene elastomer selected from the group consisting of polybutadienes (BRs) (especially those having a content of cis-1,4-bonds of greater than 90%), synthetic polyisoprenes (IRs), natural rubber (NR), butadiene copolymers, isoprene copolymers and mixtures of these elastomers; such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), isobutene/isoprene copolymers (IIRs) and mixtures of such copolymers.

The elastomers can, for example, be block, random, sequential or microsequential elastomers and can be prepared in dispersion or in solution; they can be coupled and/or star-branched or else functionalized with a coupling and/or star-branching or functionalizing agent. For coupling with carbon black, mention may be made, for example, of functional groups comprising a C—Sn bond or of aminated functional groups, such as benzophenone, for example; for coupling with a reinforcing inorganic filler such as silica, mention may be made, for example, of silanol functional groups or polysiloxane functional groups having a silanol end (as described, for example, in U.S. Pat. No. 6,013,718), of alkoxysilane groups (as described, for example, in U.S. Pat. No. 5,977,238), of carboxylic groups (as described, for example, in U.S. Pat. No. 6,815,473 or US 2006/0089445) or else of polyether groups (as described, for example, in U.S. Pat. No. 6,503,973). Mention may also be made, as other examples of such functionalized elastomers, of the elastomers (such as SBR, BR, NR or IR) of the epoxidized type.

According to one particularly preferred embodiment of the invention, the diene elastomer used is a butyl rubber (that is optionally chlorinated or brominated), whether this copolymer is used alone or as a mixture with highly unsaturated diene elastomers as mentioned above, especially NR or IR, BR or SBR.

Thus, according to another particularly more preferred embodiment, the elastomer composition of the heat-expandable rubber layer comprises, as diene elastomer, 50 to 100 phr of butyl rubber, it being possible for the latter to be combined, at 0 to 50 phr, with another diene elastomer preferably selected from the group consisting of natural rubber, synthetic polyisoprenes, polybutadienes having a content of cis-1,4-bonds of greater than 90%, butadiene/styrene copolymers and blends of these elastomers.

According to another particularly preferred embodiment of the invention, the diene elastomer used is selected from the group consisting of natural rubber, synthetic polyisoprenes, polybutadienes, butadiene/styrene copolymers and mixtures of these elastomers, whether the latter is used alone or as a mixture with essentially saturated diene elastomers as mentioned above, especially a butyl rubber.

The following are preferably suitable: polybutadienes having a content of 1,2-units of between 4% and 80% or those having a content of cis-1,4-units of greater than 80%, in particular greater than 90%, butadiene/styrene copolymers and in particular those having a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and especially those having an isoprene content of between 5% and 90% by weight and a glass transition temperature ("$T_g$", measured according to ASTM D3418-82) from −80° C. to −40° C., or isoprene/styrene copolymers and especially those having a styrene content of between 5% and 50% by weight and a $T_g$ of between −50° C. and −10° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a $T_g$ of between −20° C. and −70° C., are especially suitable.

According to another particularly preferred embodiment of the invention, the elastomer composition of the heat-expandable rubber layer comprises 50 to 100 phr of natural rubber or synthetic polyisoprene, it being possible for the latter to be combined, at 0 to 50 phr, with another diene elastomer such as SBR, BR, or an SBR/BR mixture. The use of natural rubber or of synthetic polyisoprene may advantageously improve the toughness, and tear strength of the foam rubber layer once it is expanded.

Synthetic elastomers other than diene elastomers, or even polymers other than elastomers, for example thermoplastic polymers, may be combined, in a minority amount, with the diene elastomers of the treads according to the invention.

4.2. Filler

Use may be made of any type of filler known for its capabilities of reinforcing a rubber composition, for example an organic filler, such as carbon black, or an inorganic filler, such as silica, with which a coupling agent is combined in a known way.

Such a filler preferably consists of nanoparticles, the average size (by weight) of which is less than one micrometer, generally less than 500 nm, usually between 20 and 200 nm, in particular and more preferably between 20 and 150 nm.

Preferably, the content of total reinforcing filler (in particular silica or carbon black or a mixture of silica and carbon black) is between 10 and 100 phr. A content of more than 10 phr is favourable to a good mechanical strength; above 100 phr there is a risk of excessive rigidity and of limited extensibility of the rubber layer. For these reasons, the content of total reinforcing filler is more preferably between 10 and 50 phr.

All carbon blacks, especially blacks conventionally used in tyres ("tyre-grade" blacks) are suitable as carbon blacks, such as blacks of the 100, 200, 300, 500, 600 or 700 series (ASTM grades), such as, for example, the N115, N134, N234, N326, N330, N339, N347, N375, N550, N683 or N772 blacks. The carbon blacks could, for example, already be incorporated in the diene, especially isoprene, elastomer in the form of a masterbatch (see, for example, applications WO 97/36724 or WO 99/16600).

Mention may be made, as examples of organic fillers other than carbon blacks, of the functionalized polyvinyl organic fillers as described in applications WO-A-2006/069792, WO-A-2006/069793, WO-A-2008/003434 and WO-A-2008/003435.

The expression "reinforcing inorganic filler" should be understood here to mean any inorganic or mineral filler, whatever its colour and its (natural or synthetic) origin, also known as "white filler", "clear filler" or sometimes "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

Mineral fillers of the siliceous type, in particular silica ($SiO_2$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 m²/g, preferably from 30 to 400 m²/g, in particular between 60 and 300 m²/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG and the Zeopol 8715, 8745 and 8755 silicas from Huber.

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Use is made in particular of silane polysulphides, referred to as "symmetrical" or "asymmetrical" depending on their specific structure, as described, for example, in applications WO 03/002648 (or US 2005/016651) and WO 03/002649 (or US 2005/016650).

Particularly suitable, without the definition below being limiting, are silane polysulphides corresponding to the following general formula (I):

$$Z\text{-}A\text{-}S_x\text{-}A\text{-}Z, \quad (I)$$

in which:
x is an integer from 2 to 8 (preferably from 2 to 5);
the A symbols, which are identical or different, represent a divalent hydrocarbon-based radical (preferably, a $C_1$-$C_{18}$ alkylene group or a $C_6$-$C_{12}$ arylene group, more particularly a $C_1$-$C_{10}$, especially $C_1$-$C_4$, alkylene, in particular propylene);

the Z symbols, which are identical or different, correspond to one of the three formulae below:

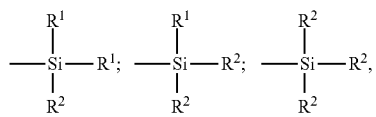

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, especially $C_1$-$C_4$ alkyl groups, more particularly methyl and/or ethyl);

the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to formula (I) above, especially standard commercially-available mixtures, the average value of "x" is a fractional number preferably between 2 and 5, more preferably close to 4. But the invention may also be advantageously carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$ or bis (triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulphides (in particular disulphides, trisulphides or tetrasulphides), more particularly bis(monoethoxydimethylsilylpropyl)tetrasulphide, as described in the aforementioned patent application WO 02/083782 (or U.S. Pat. No. 7,217,751).

Mention will especially be made, as examples of coupling agents other than an alkoxysilane to polysulphide, of bifunctional POSs (polyorganosiloxanes) or else of hydroxysilane polysulphides ($R^2$=OH in formula I above), such as described, for example, in patent applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in patent applications WO 2006/125532, WO 2006/125533 or WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815 or WO 2007/098080.

Of course, use could also be made of mixtures of the coupling agents described previously, as described in particular in the aforementioned application WO 2006/125534.

When they are reinforced by an inorganic filler such as silica, the elastomer compositions preferably comprise between 2 and 15 phr, more preferably between 3 and 12 phr of coupling agent.

A person skilled in the art will understand that, as equivalent filler to the reinforcing inorganic filler described in the present section, a reinforcing filler of another nature, in particular organic nature, could be used provided that this reinforcing filler is covered with an inorganic layer, such as silica, or else comprises functional sites, in particular hydroxyl sites, at its surface that require the use of a coupling agent in order to form the bond between the filler and the elastomer.

4.3. Blowing Agent and Associated Hot-Melt Compound

As is known, a blowing agent is a thermally decomposable compound, intended to release, during a thermal activation, for example during the vulcanization of the pneumatic tyre, a large amount of gas and to thus lead to the formation of bubbles. The release of gas into the rubber composition therefore originates from this thermal decomposition of the blowing agent. In most cases, the gas formed is nitrogen, but it may also be, depending on the nature of the blowing agent used, that this gas contains carbon dioxide.

There are physical or chemical blowing agents, of endothermic or exothermic type. Use is preferably made of chemical blowing agents, more preferably of chemical blowing agents of exothermic type.

Among the blowing agents that can preferably be used, mention will especially be made of those selected from the group consisting of azo, nitroso, hydrazine, carbazide, semicarbazide, tetrazole, carbonate and citrate compounds, and mixtures of such compounds.

These blowing agents are more preferably selected from the group consisting of diazo, dinitroso, sulphonyl semicarbazide and sulphonyl hydrazide compounds, and mixtures of such compounds. Among the latter, mention may more particularly be made of dinitroso-pentane-ethylene tetramine, dinitroso-pentane-styrene tetramine, azodicarbonamide, N,N'-dimethyl-N,N'-dinitrosophthalamide, benzenesulphonyl hydrazide, toluenesulphonyl hydrazide, p,p'-oxybis(benzenesulphonyl hydrazide), p-toluenesulphonyl semicarbazide or else p,p'-oxybis(benzenesulphonyl semicarbazide); in these examples, the gas formed is composed of a mixture of nitrogen and carbon dioxide.

Among the blowing agents that release only carbon dioxide, mention may be made, for example, of the following compounds: alkali and alkaline-earth metal carbonates and bicarbonates, such as sodium carbonate or bicarbonate, ammonium carbonate or bicarbonate, citrates such as sodium monocitrate, malonic acid and citric acid.

Preferably, the content of blowing agent in the elastomer composition is between 20 and 70 phr, more preferably within a range of from 25 to 65 phr.

One essential feature of the invention is adding a hot-melt compound, the melting point of which is between 70° C. and 150° C., preferably between 100° C. and 150° C., more preferably between 110° C. and 140° C., to the blowing agent described above. The melting point is a well-known base physical constant (available for example in "Handbook of Chemistry and Physics") of organic or inorganic hot-melt compounds; it could be verified by any known method, for example by the Thiele method, the Kofler bench method or else by DSC.

The content of this hot-melt compound is between 10 and 50 phr, preferably within a range of from 15 to 45 phr. It has the role of being converted to liquid in the specific temperature range indicated above, before or at the moment when the blowing agent thermally decomposes and releases bubbles of gas. Its addition at the high contents recommended above therefore makes it possible, unexpectedly, to limit the expansion ratio of the foam rubber layer, and to lead to an intercellular structure that is more compact and more homogeneous and finally more effective with respect to noise for a given layer thickness.

Any compound having a melting point between 70° C. and 150° C., preferably between 100° C. and 150° C., is likely to be suitable. Use will especially be able to be made of the rubber additives known to those skilled in the art as being compatible, both as regards their form (for example in powder form) and their chemical nature, with standard rubber compositions for pneumatic tyres.

By way of example, mention may especially be made of thermoplastic polymers such as polyethylene, polypropylene, polystyrene.

Mention may also be made, as examples of thermoplastic hydrocarbon-based resins having a high glass transition temperature ($T_g$), the melting point (or what is here considered to be equivalent, the softening point, measured for example according to the known "Ring and Ball" method—standard ISO 4625) of which is between 70° C. and 150° C., preferably between 100 and 150° C.

The term "resin" is reserved in the present application, by definition, as known to those skilled in the art, to a compound which is solid at room temperature (23° C.), as opposed to a liquid plasticizer compound such as an oil.

These hydrocarbon-based resins are polymers well known to those skilled in the art, essentially based on carbon and hydrogen, which can be used in particular as plasticizing agents or tackifiers in polymeric matrices. They may be aliphatic, cycloaliphatic, aromatic, hydrogenated aromatic, of the aliphatic/aromatic type, i.e. based on aliphatic and/or aromatic monomers. They may be natural or synthetic resins, whether or not based on petroleum (if such is the case, they are also known as petroleum resins). Such thermoplastic hydrocarbon-based resins may be selected, for example, from the group consisting of cyclopentadiene homopolymer or copolymer resins, dicyclopentadiene homopolymer or copolymer resins, terpene homopolymer or copolymer resins, terpene-phenol homopolymer or copolymer resins, $C_5$-cut homopolymer or copolymer resins, $C_9$-cut homopolymer or copolymer resins, α-methylstyrene homopolymer or copolymer resins and mixtures of these resins.

According to one particularly preferred embodiment, the hot-melt compound selected is urea or a hot-melt derivative of urea. Urea in particular has a melting point that is well suited to the targeted application.

Preferably, the total amount of blowing agent and of hot-melt compound is between 30 and 115 phr, preferably within a range of from 35 to 110 phr.

4.4. Various Additives

The elastomer composition of the heat-expandable layer may also comprise all or some of the usual additives customarily used in the rubber compositions for tyres, such as, for example, protective agents such as chemical antiozonants, antioxidants, plasticizing agents or extender oils, whether the latter are of aromatic or non-aromatic nature, in particular non-aromatic or very weakly aromatic oils, for example of naphthenic or paraffinic type, having a high viscosity or preferably having a low viscosity, MES oils, TDAE oils, plant oils, fillers other than those mentioned previously, for example short fibres, platy fillers (e.g. phyllosilicates such as kaolin, talc, mica, graphite, clays or modified clays (organoclays)) capable of further improving the noise barrier effect, a crosslinking system based either on sulphur or on sulphur donors and/or on peroxide and/or on bismaleimides, vulcanization accelerators and vulcanization activators.

The elastomer composition of the heat-expandable layer may also contain coupling activators when a coupling agent is used, agents for covering the inorganic filler when an inorganic filler is used, or more generally processing aids capable, in a known manner, owing to an improvement of the dispersion of the filler in the rubber matrix and to a lowering of the viscosity of the compositions, of improving their ability to be processed in the uncured state; these agents are, for example, hydrolysable silanes or hydroxysilanes such as alkylalkoxysilanes, polyols, polyethers, amines or hydroxylated or hydrolysable polyorganosiloxanes.

4.5. Manufacture of the Compositions

The rubber compositions forming the foam rubber layer are manufactured in appropriate mixers using, for example, three successive preparation phases according to a general procedure well known to a person skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second (non-productive) phase at a lower temperature (preferably below 100° C.) during which the blowing agent is incorporated, and finally a third phase of mechanical working (sometimes referred to as a "productive" phase) at low temperature, typically below 120° C., for example between 60° C. and 100° C., finishing phase during which the crosslinking or vulcanization system is incorporated.

A process that can be used for the manufacture of such rubber compositions comprises, for example, and preferably, the following stages:

in a mixer, incorporating into the elastomer or into the mixture of elastomers, at least the filler and the hot-melt compound, everything being kneaded thermomechanically, in one or more steps, until a maximum temperature of between 130° C. and 200° C. is reached;

cooling the combined mixture to a temperature below 100° C.;

then incorporating the blowing agent into the mixture thus obtained and cooled, everything being kneaded thermomechanically until a maximum temperature of below 100° C. is reached;

subsequently incorporating a crosslinking system;

kneading everything up to a maximum temperature below 120° C.;

extruding or calendering the rubber composition thus obtained.

By way of example, during the first non-productive phase all the necessary constituents, the optional additional covering agents or processing aids, and other various additives, with the exception of the blowing agent and the crosslinking system, are introduced into an appropriate mixer, such as a standard internal mixer. After thermomechanical working, dropping and cooling of the mixture thus obtained, a second (non-productive) phase of thermomechanical working is then carried out in the same internal mixer, during which phase the blowing agent is incorporated at a more moderate temperature (for example 60° C.), in order to attain a maximum dropping temperature of less than 100° C. The crosslinking system is then incorporated, at low temperature, generally in an external mixer, such as an open mill The combined mixture is then mixed (productive phase) for a few minutes, for example between 5 and 15 min.

The crosslinking system itself is preferably based on sulphur and on a primary vulcanization accelerator, in particular an accelerator of the sulphenamide type. Added to this vulcanization system are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 5 phr and the primary accelerator content is preferably between 0.5 and 8 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are for example selected from the group consisting of 2-mercaptobenzothiazyl disulphide (abbreviated to "MBTS"), tetrabenzylthiuram disulphide ("TBZTD"), N-cyclohexyl-2-benzothiazyl sulphenamide ("CBS"), N,N-dicyclohexyl-2-benzothiazyl sulphenamide ("DCBS"), N-tert-butyl-2-benzothiazyl sulphenamide ("TBBS"), N-tert-butyl-2-benzothiazyl sulphenimide ("TBSI"), zinc dibenzyldithiocarbamate ("ZBEC") and the mixtures of these compounds The final composition thus obtained is then calendered, for example in the form of a sheet or a slab, in particular for laboratory characterization, or else is calendered or extruded in the form of a semi-finished product that can be used directly as a heat-expandable elastomer layer.

In the uncured (i.e. unvulcanized) state and therefore non-expanded state, the density or specific gravity, denoted by $D_1$, of the rubber layer is preferably between 1.000 and 1.300 g/cm$^3$, more preferably within a range of from 1.025 to 1.250 g/cm$^3$; its thickness is preferably between 0.5 and 5 mm, more preferably between 1 and 3 mm.

The vulcanization (or curing) is carried out, in a known manner, at a temperature generally between 130° C. and 200° C., for a sufficient time that may vary, for example, between 5 and 90 min depending in particular on the curing temperature, on the vulcanization system used and on the vulcanization kinetics of the composition in question.

It is during this vulcanization step that the blowing agent will release a large amount of gas, resulting in the formation of bubbles in the foam rubber composition and finally in its expansion.

In the cured (i.e. vulcanized) state and therefore expanded state, the density, denoted by $D_2$, of the foam rubber layer is preferably within a range of from 0.200 to 0.600 g/cm$^3$, more preferably from 0.250 to 0.450 g/cm$^3$; its thickness is preferably between 2 and 20 mm, more preferably between 4 and 12 mm.

Its volume expansion ratio, denoted by $T_E$ (expressed in %) is preferably between 100% and 400%, more preferably between 150% and 300%, this expansion ratio $T_E$ being calculated in a known manner from the densities $D_1$ and $D_2$ above, as follows:

$$T_E = [(D_1/D_2) - 1] \times 100$$

5. EXEMPLARY EMBODIMENTS OF THE INVENTION 5.1. Pneumatic Tyres of the Invention The foam rubber composition described previously can advantageously be used in the pneumatic tyres of all types of vehicles, in particular in passenger vehicle tyres.

By way of example, appended FIGS. 1 to 4 very schematically (in particular not to a specific scale) represent examples of radial cross sections of motor vehicle pneumatic tyres having radial carcass reinforcement, in accordance with the invention, these tyres being in the uncured (i.e. unvulcanized) state (FIGS. 1 and 3) or in the cured (i.e. vulcanized) state (FIGS. 2 and 4).

These pneumatic tyres 1 comprise a crown region 2 reinforced by a crown reinforcement or belt 6, two sidewalls 3 and two inextensible beads 4, each of these beads 4 being reinforced with a bead wire 5. The crown region 2, delimited laterally by two shoulders (2a, 2b) is surmounted by a tread (not shown in this schematic figure, for simplification), the belt 6 consisting, for example, of at least two superposed crossed plies reinforced by metal cords. A carcass reinforcement 7 is wound around two bead wires 5 in each bead 4, the upturn 8 of this reinforcement 7 being for example positioned towards the outside of the pneumatic tyres, which here are shown fitted onto their rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the axis of rotation of the pneumatic tyre, which lies halfway between the two beads 4 and passes through the middle of the crown reinforcement 6).

These pneumatic tyres 1 also comprise, in a well-known manner, an inner rubber layer 10 (commonly referred to as "inner liner") that defines the radially inner face of the pneumatic tyre, in contact with the inflation cavity 11. This airtight layer 10 enables the tyre 1 to be inflated and kept pressurized. Its sealing properties enable it to guarantee a relatively low rate of pressure loss, enabling the pneumatic tyre to be kept inflated, in a normal operating state, for a sufficient duration, normally for several weeks or several months.

These pneumatic tyres in accordance with the invention are characterized in that their inner wall 10 is at least partly covered, on the side of the cavity 11, with a rubber layer 12 (which rubber layer is expandable when the pneumatic tyre is in the uncured state and expanded when it is cured) capable of partly absorbing the cavity noise when its structure is expanded (i.e. after curing or vulcanization of the pneumatic tyre).

In accordance with a first possible embodiment of the invention, said inner wall (10) comprises, on its radially inner face, a heat-expandable rubber layer (12) that extends substantially over the entire inner wall of the pneumatic tyre, extending from one sidewall to the other, practically up to the rim flange when the pneumatic tyre 1 is in the fitted position, as illustrated for example in FIGS. 3 and 4.

According to other possible embodiments, the layer 12 could however merely cover, still on its radially inner face, one part only of the airtight layer (10), for example only the crown region of the pneumatic tyre or could extend at least from the crown region to the shoulders (as illustrated for example in FIGS. 1 and 2) or even to the sidewall mid-point (equator) of said tyre.

In the examples of the FIGS. 1 to 4 above, the layer 10 (for example having a thickness equal to around 1.0 mm) is for example based on butyl rubber, it has a standard formulation for an inner liner.

The rubber layer 12 itself consists of an elastomer composition as described previously based on at least one elastomer (such as a butyl rubber, or natural rubber that may or may not be used in combination with a synthetic elastomer such as SBR or BR), a filler such as carbon black or silica, a blowing agent such as azodicarbonamide and a hot-melt compound such as urea.

The thickness of this layer 12 is for example from 1 to 3 mm in the uncured state (before vulcanization) and from 4 to 12 mm in the cured (expanded) state. This layer 12, once expanded, placed between the sealing layer 10 and the cavity 11 of the pneumatic tyre, makes it possible to substantially reduce, as the following examples demonstrate, the noise due to rolling detected inside the vehicle.

The pneumatic tyre that is the subject of the invention, provided with its layer (12) as described previously, may be manufactured without difficulty, it being possible for the heat-expandable elastomer composition to be applied in a conventional manner at the desired location. One advantageous manufacturing variant for those skilled in the art of pneumatic tyres, will consist for example, during a first stage, in laying down the heat-expandable elastomer composition flat, directly onto a tyre-building drum, in the form of a skim of suitable thickness, before this skim is covered with the airtight layer ("inner liner"), followed by the rest of the structure of the pneumatic tyre, according to manufacturing techniques well known to those skilled in the art.

5.2. Running Tests

A) Test 1

This first test demonstrates that the incorporation of the hot-melt compound makes it possible to significantly reduce the expansion ratio once the pneumatic tyre is vulcanized, without furthermore affecting the noise absorption properties provided by the blowing agent.

For the requirements of this test, two rubber compositions (denoted by C-1 and C-2) were prepared, the formulation of which is given in Table 1 (content of the various products expressed in phr). Composition C-1 is the control composition, it comprises the blowing agent but lacks the hot-melt compound. Composition C-2 is in accordance with the invention, it comprises both the blowing agent and the hot-melt compound.

The manufacture of these compositions was carried out in the following manner: the reinforcing filler (carbon black), the diene elastomer (halogenated butyl rubber), the hot-melt compound (urea) for composition C-2, and also the various other ingredients, with the exception of the vulcanization system and the blowing agent were successively introduced into an internal mixer, the initial vessel temperature of which was around 60° C.; the mixer was thus filled to around 70% (% by volume). Thermomechanical working (non-productive phase) was then carried out in one stage of around 2 to 4 min, until a maximum "dropping" temperature of 140° C. was reached. The mixture thus obtained was then cooled to a temperature below 100° C., the cooled mixture was reintroduced into the same internal mixer (initial temperature 60° C.), then the blowing agent (diazo compound) was incorporated into said mixture (mixer filled to around 70% by volume). A second thermomechanical working (non-productive phase) was then carried out in one stage of around 2 to 4 min, until a maximum dropping temperature below 100° C. was reached. The mixture thus obtained was recovered and cooled and then sulphur and an accelerator of sulphenamide type were incorporated in an external mixer (homofinisher) at 30° C., the combined mixture being mixed (productive phase) for a few minutes.

The two compositions thus obtained were then calendered in the form of a rubber strip (12) having a thickness equal to around 2 mm, which was then incorporated, as indicated previously, into a passenger vehicle tyre (dimensions 225/55 R17) as illustrated in FIG. 1. The tyres (denoted by P-1 and P-2) corresponding respectively to compositions C-1 and C-2, were tested as indicated in appended Tables 2 and 3.

After curing, the thickness of the (expanded) foam rubber layer was respectively around 8 mm (tyre P-1) and around 6 mm (tyre P-2).

Table 2 indicates the densities of the rubber layer before and after curing of the pneumatic tyre, and also the volume expansion ratio and the average size of the bubbles formed after curing. The densities were measured in the standard manner by immersion in water, the volume expansion ratio was calculated as indicated previously, the average size (number-average size) of the bubbles was measured by SEM (enlargement of 200) on transverse cross sections made through the foam rubber layers.

On reading Table 2, it is firstly observed that the incorporation of the hot-melt compound (tyre P-2 according to the invention) makes it possible to very greatly reduce (by a factor of more than 2.5) the size of the bubbles formed and the expansion ratio of the foam rubber layer once the tyre is cured, compared to the solution tested using only the blowing agent (tyre P-1 not in accordance with the invention).

To subsequently characterize the noise reduction properties of the respective rubber layers, a running test was carried out on the pneumatic tyres in which the sound level emitted was evaluated by measuring the sound pressure level, when the vehicle is running, owing to several microphones placed inside the vehicle. The vehicle used was a Toyota vehicle ("Celsior"). The roadway surface used for this test corresponds to a semi-rough asphalt. The speed of the vehicle is adjusted to 40 and 60 km/h. When it passes into the area of measurement, the recording of the sound pressure is started.

The results from Table 3 express the differences in the recorded sound level between, on the one hand, the tyre P-2 in accordance with the invention and a control tyre denoted by P-0, on the other hand, the tyre P-1 (not in accordance with the invention) and the same control tyre P-0, in a range of frequencies of from 190 to 230 Hz ("cavity noise") on the one hand and from 0 to 2000 Hz ("road noise") on the other hand. These differences are expressed as sound energy (dB(A)) which corresponds to the integration of the sound pressure as a function of the frequency over the range of frequencies in question, a negative value indicating a reduction in the noise relative to the reference. The control tyre P-0 is identical to the tyres P-1 and P-2 except for the fact that it does not contain a foam rubber layer inside its cavity; it is used as a reference tyre in this test.

On reading Table 3, it is observed that a substantially identical noise reduction is obtained on the two types of tyres (P-1 and P-2), of 1 to 5 dB(A) depending on the frequency and speed in question. Such a reduction is quite significant for a person skilled in the art.

In conclusion, the pneumatic tyre of the invention (P-2), the expansion ratio of the foam rubber layer of which is nevertheless very substantially reduced, does not emit more noise inside the vehicle than the control pneumatic tyre P-1.

B) Test 2

This second test confirms the beneficial effect of the invention when another rubber formulation, here based on NR and SBR elastomers, is used to form the matrix of the foam rubber layer.

For the requirements of this test, a rubber composition (denoted by C-3) was prepared as indicated previously for Test 1. Its formulation is given in Table 4 (content of the products in phr): this composition C-3, in accordance with the invention, comprises both a blowing agent and a hot-melt compound.

to The composition C-3 was then calendered in the form of two rubber layers (12) of different thicknesses (1.5 mm and 2.0 mm in the uncured state) which were then incorporated, as indicated previously, into two passenger vehicle tyres (denoted respectively by P-3 and P-4) (dimensions 225/55 R17), both in accordance with the invention, and as shown schematically in FIG. 1.

Before and after curing, the pneumatic tyres (P-3 and P-4) were tested as indicated in appended Tables 5 and 6. After curing, the thickness of the two foam rubber layers was respectively around 4 mm (tyre P-3) and around 5 mm (tyre P-4).

Table 5 indicates the densities of the rubber layer before and after curing of the tyres in accordance with the invention (P-3 and P-4), and also the volume expansion ratio after curing.

On reading Table 5, it is observed as above in Test 1 that the incorporation of the hot-melt compound makes it possible to obtain a limited expansion ratio of the foam rubber layer, of between 150% and 350%.

The results from Table 6 express the differences in the recorded sound level between the pneumatic tyres P-3 and P-4 (both in accordance with the invention) and the control tyre P-0 (without foam rubber), in the range of frequencies tested previously ("cavity noise" and "road noise"). It is noted that the noise is substantially reduced in both cases, even more so when the thickness of the foam rubber layer is large.

In conclusion, what is remarkable and unexpected, the combined use of the blowing agent and of the hot-melt compound, at the recommended high contents, makes it possible to very greatly reduce the expansion ratio and therefore the thickness of the foam rubber layer in the final expanded state (i.e. once the pneumatic tyre is vulcanized), without affecting the noise absorption properties provided by the blowing agent; at a constant layer thickness, it is possible to substantially increase the noise absorption capacity of this foam rubber layer.

TABLE 1

| | Composition (phr): | |
|---|---|---|
| | C-1 | C-2 |
| BIIR (1) | 100 | 100 |
| aromatic oil | 20 | 20 |
| carbon black (2) | 30 | 30 |
| blowing agent (3) | 50 | 50 |
| hot-melt compound (4) | — | 25 |
| tackifying resin (5) | 3 | 3 |
| ZnO | 1 | 1 |
| stearic acid | 0.7 | 0.7 |
| antioxidant (6) | 2 | 2 |
| sulphur | 1 | 1 |
| accelerator (7) | 1.5 | 1.5 |

(1) halogenated (brominated) isobutylene/isoprene copolymer;
(2) ASTM grade N774 (Cabot);
(3) azodicarbonamide ("Cellmic C-22" from Sankyo Kasei);
(4) urea (Mitsui Chemical);
(5) "Koresin" (BASF);
(6) N-1,3-dimethylbutyl-N-phenyl-para-phenylenediamine (Santoflex 6-PPD from Flexsys);
(7) 2-mercaptobenzothiazyl disulphide ("Santocure MBTS" from Flexsys).

TABLE 2

| | Composition tested (as tyre): | |
|---|---|---|
| | C-1 | C-2 |
| Density before curing of the tyre | 1.044 | 1.074 |
| Density after curing of the tyre | 0.139 | 0.307 |
| Volume expansion ratio (%) | 650 | 250 |
| Average size of the bubbles (microns) | 510 | 200 |

TABLE 3

| Test conditions: | | Speed | Tyre P-1 | Tyre P-2 |
|---|---|---|---|---|
| Noise performance in dB(A) (*) | "Cavity noise" [190-230 Hz] (dBA) | 40 km/h | −3.9 | −3.7 |
| | | 60 km/h | −5.0 | −4.7 |
| | "Road noise" [0-2000 Hz] (dBA) | 40 km/h | −1.0 | −1.0 |
| | | 60 km/h | −1.1 | −1.1 |

(*) difference between the tyre tested and the control tyre (P-0), inside the vehicle.

TABLE 4

| | Composition (phr): |
|---|---|
| | C-3 |
| NR (1) | 85 |
| SBR (2) | 15 |
| TDAE oil (3) | 10 |
| carbon black (4) | 20 |
| blowing agent (5) | 30 |
| hot-melt compound (6) | 20 |
| tackifying resin (7) | 3 |
| ZnO | 3 |
| stearic acid | 0.5 |
| antioxidant (8) | 2 |
| sulphur | 3 |
| accelerator (9) | 1.5 |

(1) natural rubber (peptized);
(2) SBR with 23.5% of styrene; 75% of trans-1,4 units; 8% of cis-1,4 units ($T_g$ = −48° C.);
(3) TDAE ("Viva Tec500" from Starry oil);
(4) ASTM grade N550 (Cabot);
(5) azodicarbonamide ("Cellmic C-22" from Sankyo Kasei);
(6) urea (Mitsui Chemical);
(7) "Koresin" (BASF);
(8) N-1,3-dimethylbutyl-N-phenyl-para-phenylenediamine (Santoflex 6-PPD from Flexsys);
(9) N-dicyclohexyl-2-benzothiazole sulphenamide ("Santocure CBS" from Flexsys).

TABLE 5

| | Composition tested (as tyre): |
|---|---|
| | C-3 |
| Density before curing of the tyre | 1.086 |
| Density after curing of the tyre | 0.347 |
| Volume expansion ratio (%) | 213 |

TABLE 6

| Test conditions: | | Speed | P-3 | P-4 |
|---|---|---|---|---|
| Noise performance in dB(A) (*) | "Cavity noise" [190-230 Hz] (dBA) | 40 km/h | −1.1 | −1.4 |
| | | 60 km/h | −2.5 | −3.2 |
| | "Road noise" [0-2000 Hz] (dBA) | 40 km/h | −0.4 | −0.6 |
| | | 60 km/h | −0.9 | −1.0 |

(*) difference between the tyre tested and the control tyre (P-0), inside the vehicle.

The invention claimed is:

1. A pneumatic tyre in an unvulcanized state, the tyre comprising:
 an inner wall; and
 a heat-expandable rubber layer positioned on the inner wall, the heat-expandable layer being formed of an elastomer composition including at least:
  an elastomer,
  a reinforcing filler,
  between 20 and 80 phr of a blowing agent, and
  between 10 and 50 phr of a hot-melt compound having a melting point between 70° C. and 150° C.
2. A pneumatic tyre according to claim 1, wherein the elastomer is a diene elastomer selected from a group that includes natural rubbers, synthetic polyisoprenes, polybutadienes, butadiene copolymers, isoprene copolymers, and mixtures thereof.

3. A pneumatic tyre according to claim 2, wherein the diene elastomer is 50 to 100 phr of a natural rubber or a synthetic polyisoprene.

4. A pneumatic tyre according to claim 2, wherein the diene elastomer is 50 to 100 phr of butyl rubber.

5. A pneumatic tyre according to claim 1, wherein the elastomer composition includes between 10 and 100 phr of the reinforcing filler.

6. A pneumatic tyre according to claim 5, wherein the elastomer composition includes between 10 and 50 phr of the reinforcing filler.

7. A pneumatic tyre according to claim 1, where the reinforcing filler includes silica or carbon black or a mixture of silica and carbon black.

8. A pneumatic tyre according to claim 1, wherein the blowing agent is selected from a group of compounds that includes azos, nitrosos, hydrazines, carbazides, semicarbazides, tetrazoles, carbonates, citrates, and mixtures thereof.

9. A pneumatic tyre according to claim 8, wherein the blowing agent is selected from a group of compounds that includes diazo, dinitroso, sulphonyl semicarbazide, sulphonyl hydrazide, and mixtures thereof.

10. A pneumatic tyre according to claim 9, wherein the blowing agent is an azodicarbonamide compound.

11. A pneumatic tyre according to claim 1, wherein the elastomer composition includes between 20 and 70 phr of the blowing agent.

12. A pneumatic tyre according to claim 1, wherein an amount of the hot-melt compound in the elastomer composition is in a range of from 10 to 45 phr.

13. A pneumatic tyre according to claim 1, wherein a total amount of the blowing agent and the hot-melt compound is between 30 and 115 phr.

14. A pneumatic tyre according to claim 1, wherein the melting point of the hot-melt compound is between 100° C. and 150° C.

15. A pneumatic tyre according to claim 1, wherein the hot-melt compound is urea or a hot-melt derivative of urea.

16. A pneumatic tyre according to claim 1, wherein a density of the heat-expandable rubber layer is between 1.000 and 1.3000 $g/cm^3$.

17. A pneumatic tyre according to claim 1, wherein a thickness of the heat-expandable rubber layer is between 0.5 and 5 mm.

18. A pneumatic tyre in a vulcanized state obtained from curing an unvulcanized pneumatic tyre, wherein the unvulcanized pneumatic tyre includes:
an inner wall; and
a heat-expandable rubber layer positioned on the inner wall, the heat-expandable layer being formed of an elastomer composition including at least:
an elastomer,
a reinforcing filler,
between 20 and 80 phr of a blowing agent, and
between 10 and 50 phr of a hot-melt compound having a melting point between 70° C. and 150° C.

19. A pneumatic tyre according to claim 18, wherein a density of the heat-expandable rubber layer, which has been expanded after the curing, is within a range of from 0.200 to 0.600 $g/cm^3$.

20. A pneumatic tyre according to claim 18, wherein a thickness of the heat-expandable rubber layer, which has been expanded after the curing, is between 2 and 20 mm.

21. A pneumatic tyre according to claim 18, wherein a volume expansion ratio of the heat-expandable rubber layer, which has been expanded after the curing, is between 100% and 400%.

* * * * *